(12) United States Patent
Domen et al.

(10) Patent No.: US 7,223,377 B2
(45) Date of Patent: May 29, 2007

(54) PROCESS FOR PRODUCING MICRO-MESOPOROUS METAL OXIDE HAVING REGULATED PORES FORMED BY NOVEL TEMPLATE REMOVAL METHOD

(75) Inventors: Kazunari Domen, Kanagawa (JP); Junko Nomura, Kanagawa (JP); Byonjin Ri, Tokyo (JP)

(73) Assignee: Japan Science and Technology Agency, Saitama-ken (JP)

( * ) Notice: Subject to any disclaimer, the term of this patent is extended or adjusted under 35 U.S.C. 154(b) by 174 days.

(21) Appl. No.: 10/507,478

(22) PCT Filed: Oct. 2, 2002

(86) PCT No.: PCT/JP02/10282

§ 371 (c)(1), (2), (4) Date: Sep. 13, 2004

(87) PCT Pub. No.: WO03/080514

PCT Pub. Date: Oct. 2, 2003

(65) Prior Publication Data

US 2005/0226805 A1    Oct. 13, 2005

(30) Foreign Application Priority Data

Mar. 26, 2002    (JP) .............................. 2002-085737

(51) Int. Cl.
- C01G 13/14 (2006.01)
- C01G 3/02 (2006.01)
- C01G 9/02 (2006.01)
- C01G 11/00 (2006.01)
- C01G 15/00 (2006.01)

(52) U.S. Cl. ............... 423/592.1; 423/593.1; 423/594.1; 423/594.3; 423/594.5; 423/594.8; 423/594.9; 423/594.12; 423/594.13; 423/594.14; 423/594.17; 423/594.18; 423/594.19; 423/604; 423/605; 423/606; 423/608; 423/617; 423/622; 423/632

(58) Field of Classification Search ............. 423/593.1, 423/594.8, 594.17, 592.1, 594.1, 594.3, 594.5, 423/595, 598, 599, 594.9, 594.12, 594.13, 423/594.14, 594.18, 594.19, 604, 605, 606, 423/608, 617, 622, 632

See application file for complete search history.

(56) References Cited

U.S. PATENT DOCUMENTS

| 5,958,367 | A  | * | 9/1999  | Ying et al. .................. 423/701 |
| 6,528,034 | B1 | * | 3/2003  | Pinnavaia et al. .......... 423/335 |
| 6,630,170 | B2 | * | 10/2003 | Balkus et al. ............... 424/489 |

OTHER PUBLICATIONS

Ri Byonjin "Synthesis of High Surface Area Microporous Niobium Oxide Using Neutral Template and Characterization" 88th Catalytic Forum of Catalytic Society Sep. 20, 2001, Tokyo, Japan.

* cited by examiner

Primary Examiner—Wayne A. Langel
Assistant Examiner—James Fiorito
(74) Attorney, Agent, or Firm—Hahn & Voight PLLC

(57) ABSTRACT

The present invention is the method for preparation of transition metal oxide having micro-mesoporous structure whose average fine pores size is not less than 1 nm and not more than 2 nm comprising, adding and dissolving transition metal salt which is a precursor of transition metal oxide and/or metal alkoxide in the solution prepared by dissolving polymer surfactant in organic solvent, hydrolyzing said transition metal salt and/or metal alkoxide and preparing sol solution which is polymerized and self organized, then obtaining gel whose organization is stabilized from said sol solution and removing said polymer surfactant by using water of room temperature or water to which alkali metal or alkaline earth metal ion is added.

4 Claims, 3 Drawing Sheets

PROCESS FOR PRODUCING MICRO-MESOPOROUS METAL OXIDE HAVING REGULATED PORES FORMED BY NOVEL TEMPLATE REMOVAL METHOD

FIELD OF THE INVENTION

The present invention relates to a process for producing the micro-mesoporous metal oxide having average pore size of not more than 2 nm and not less than 1 nm by preparing fine pore structure of metal oxide using nonionic surfactant as a template through self-assembling process by sol-gel method and removing the template from the self-assembled material using water.

DESCRIPTION OF THE PRIOR ART

It is known that nonionic surfactant assembles silica to have various mesoporous framework structures by means of electrostatic force, hydrogen bond, covalent bond and van der Walls interaction. However, the pore wall of mesoporous silica, which is produced using the surfactant as a template, is amorphous and has a problem of stability, especially high hydrothermal stability. In such a circumstances, since the trial to apply above mentioned process for producing mesoporous structure to non-silica oxide was attempted and tentatively succeeded, this trial is currently expanded to the trial to produce the mesoporous materials which utilize the special property such as electronic conductivity and magnetic interaction. As the example of said materials, metal oxide such as $TiO_2$, $ZrO_2$, $Al_2O_3$, $Nb_2O_5$, $Ta_2O_5$, $WO_3$, $HfO_2$, $SnO_2$ and metal oxide including mixed oxide such as $SiAlO_{3.5}$, $Si_2AlO_{5.5}$, $SiTiO_4$, $ZrTiO_4$, $Al_2TiO_5$ and $ZrW_2O_8$ can be mentioned. Further, there is a paper reporting that the mesoporous wall formed by said materials is different from that of amorphous silica and is thermally stable and having relatively large pores with periodicity, for example, pores of 3 nm-14 nm, which can be broadly utilized, can be obtained (NATURE, vol 396, 152-155 (1998): Document A).

According to the investigation by the inventors of the present invention, the fine pore wall made of metal oxide mentioned above with mesoporous structure is amorphous. On the contrary, the inventors of the present invention have already proposed the mesoporous structural material with pore wall made of crystalline metal oxide, which is improved the disadvantage depicted above of known meso size made of metal oxide (Japanese Patent Laid open publication 2001-354419 filed on Dec. 25, 2001 B).

However, in said prior art, the template method is use at the synthesis of mesoporous silica and mesoporous metal oxide. In the template method, template is removed by baking or acid treatment after formation of mesoporous structure and net work of inorganic phase by self-assembling. This method is disadvantageous when estimated from the view point of cost, safety and environmental maintenance and has problems at the substantive industrial application. On the contrary, the mesoporous metal oxide is expected to be applied to the materials such as catalyst, sensor or semiconductor, and the cost reduction for production is also a very important subject. Further, in the case of zeolite, which is a typical micro porous material, since it has very fine pores of less than 1 nm, there is a limitation to be applied as the selective reaction or separation of molecule having bigger size than said fine pores, such as aromatic compound. Furthermore, in the case of the reported synthesized mesoporous material up to the present time, since the pore size of fine pores is relatively too large, there is a disadvantageous that shape recognizing function is not easily generated, when reaction or separation of the molecules of the size of 2 nm around.

In Japanese Patent Laid Open Publication 1997-294931 (published on Nov. 18, 1997; Document C), porous material having autonomous humidity conditioning function prepared by following method is disclosed, that is, surrounding surfactant or organic compound having long chain alkyl group with silica dioxide or oxide of transition metal and polymerized, then by removing said organic compound by baking or extracting.

In [0007] of Document C, there is a description of "In the present invention, a template agent is used to obtain uniform fine pores of around 5 nm. As the surfactant to be used as a template can be listed the surfactant represented by general formula $RN^+(R^1_3)_3.X^-$ (R: alkyl group, $R^1$: methyl or ethyl group, X: halogen such as chlorine or bromine) or $R(OCH_2CH_2)_mOH$ (R: alkyl group). As the specific example of said surfactant, decyltrimethyl ammonium bromide, dodecyltrimethylammonium bromide, tetradecyl trimethylammonium bromide hexadecyltrimethylammonium bromide, octadecyltrimethylammonium chloride, poly(oxyethylene)decylether, poly(oxyethylene)hexadecylether can be listed."

In [0009] of Document C, there is a description of "The porous material having autonomous humidity conditioning function of the present invention can be obtained by surrounding organic compound by oxide of transition metal and polymerized, then by removing the organic compound by baking or extracting.

Further, in [0009] of Document C, there is a description of "After drying, in order to remove the template of organic compound, the organic compound is extracted by organic solvent such as methanol, acetone, toluene, xylene or benzene at the temperature lower than 200° C. for not less than 3 hours or by heat treatment under presence of air at 500-1000° C., for 4-10 hours retention time.

In above mentioned circumference, it is difficult for the organic molecule with the size of aromatic compound mentioned above to be reacted or extracted selectively by using the conventional porous material, and actually, the synthesis of inorganic material with fine pores of around 1 nm is attempting. However, many results are reported which reports that the synthesis of inorganic material having fine pore with intermediate size is difficult (S. A. Bagshaw and A. R. Haymann, Adv. Mater., 13 (2001) 1011, Document C). Therefore, it is very significant to provide the process for producing the metal oxide with fine pores of around 1 nm.

That is, basically, the subject of the present invention is to dissolve the problems of maintenance of environment and production cost, and to provide a method for preparation of mesoporous metal oxide material with novel fine pore structure and internal surface of fine pore, in particular with more small fine pore size, further, the subject of the present invention is to provide a method which is able to produce mesoporous metal oxide material having desired and smaller pore size suitable for the use.

To dissolve above mentioned subjects, on investigating about the mesoporous structure by self assembling process and a process for producing mesoporous metal oxide material with fine pores structure reflecting the preparation of mesoporous metal oxide precursor at the formation of inorganic phase net work and/or mesoporous structure of said precursor, the inventors of the present invention has found out that by removing the surfactant which acts an important role to form fine pores at the process for forming said precursor, especially, nonionic surfactant which can be removed by water, by washing with water, said mesoporous metal oxide can be obtained, and solved the subject of the present invention.

SUMMARY OF THE INVENTION

The present invention is a process for producing the transition metal oxide with micro-mesoporous structure whose average pores size is not less than 1 nm and not more than 2 nm comprising, adding and dissolving transition metal salt which is a precursor of metal oxide and/or metal alkoxide in the solution prepared by dissolving polymer surfactant in organic solvent, hydrolyzing said transition metal salt and/or metal alkoxide and preparing sol solution which is polymerized and self assembled, then obtaining gel whose organization is stabilized from said sol solution and removing said polymer surfactant by using water of room temperature or water to which alkali metal or alkaline earth metal ion is added.

Desirably, the present invention is the process for producing the transition metal oxide having micro-mesoporous structure, wherein said polymer surfactant is the nonionic surfactant having polyalkyleneoxide block copolymer frame, for example, nonionic surfactant comprising block copolymer composed of polyethylene oxide chain $(CH_2CH_2O)_m$ and polypropylene oxide chain $[CH_2CH(CH_3)O]_n$ (wherein, m and n is 10-70 and end of said polymer is etherized by H, alcohol or phenol). More desirably the present invention is the method for preparation of transition metal oxide, wherein said process to obtain stabilized gel contains 2nd step aging process which is carried out under the presence of oxygen gas at 60° C. to 140° C. for 12-48 hours after gelating the sol solution to gel by primary aging process under the presence of oxygen gas at 35° C. to 60° C.

DESCRIPTION OF THE PREFERRED EMBODYMENT

Figure 1:
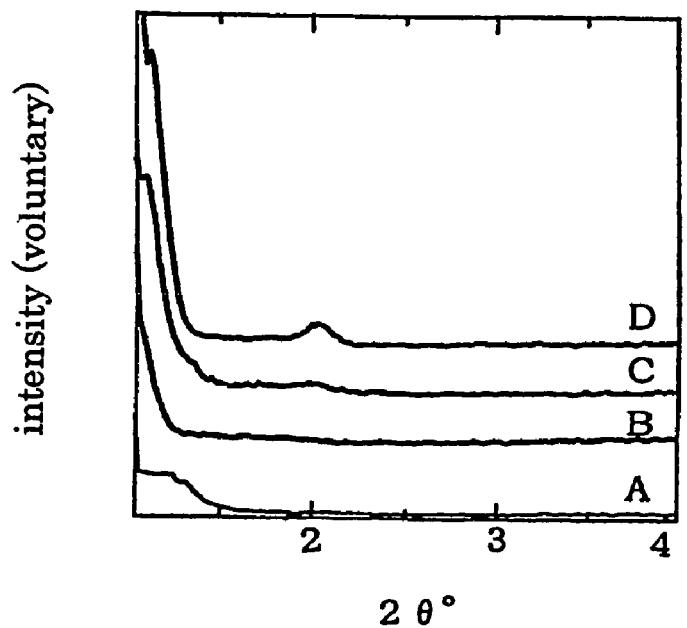
FIG. 1 shows the X-ray diffracting pattern of micro-mesoporous niobium oxide obtained in Example 1, A shows the first step aging process of gelation by aging sol solution obtained by self assembling in air at 35° C. to 60° C. for 2 to 10 days, B, C and D show relatively the cases of stabilized state of fine pores wall structure of 2nd step aging at 60° C., 80° C. and 100° C. for 12-48 hours.

The present invention will be illustrated more in detail.

A. As the metal which composes transition metal oxide with mesoporous structure of the present invention is at least one selected from the group consisting of Ti, V, Cr, Mn, Fe, Co, Ni, Cu, Zn, Ga, Ge, Zr, Nb, Mo, Ru, Cd, In, Sn, Sb, Hf, Ta, W and Re, and can be selected properly according to the use of the metal oxide with mesoporous structure. For example, zinc oxide or complex oxide obtained by the method of the present invention can be predicted to be useful as the catalyst for reaction of isomerization of epoxide, and titania or vanadium oxide can be predicted to be useful for the partial oxidation reaction of liquid phase. It was already known that the micro-mesoporous structure indicates specific catalytic property or absorption property correspond to the inorganic constitution or electric•magnetic•photo property, therefore, the known arts can be adopted for the selection of the material used for the preparation of the micro-mesoporous structure of the present invention.

B. At the preparation of the transition metal oxide with mesoporous structure of the present invention, it is important to use the template material which are actually removable by water or water to which is added small amount of additives such as alkali metal or alkali earth metal ion.

This is clearly understood by considering the average fine pore size of the mesoporous structure of the conventional arts mentioned above which is obtained by removing organic compound template by baking at the temperature of 300° C. or more is in the range of 2-6 nm.

C. Further characteristic of the present invention is that the mesoporous structure transition metal oxide whose fine pores structure is stabilized can be obtained only by removing the template material by water, in other words, without crystalline stabilization of fine pore wall by heat treatment. That is, in the production of micro-mesoporous structured transition metal oxide precursor before removal of said template, it is contrived to obtain mesoporous structured transition metal oxide whose fine pore structure is stabilized by carrying out 2nd step aging under the presence of oxygen gas at 60° C. to 140° C. for 12-48 hours on the gel obtained by aging under the presence of oxygen at 35° C. to 60° C.

D. In the present invention, as the surfactant, one or more known surfactants can be used in combination. The mixing ratio of surfactant, transition metal salt and/or metal alkoxide and water in reaction process is very important factor to form an ordered fine pore structure. And by adjusting the ratio, it is possible to control the structure of the fine pore, for example, hexagonal structure or cubic structure.

As the surfactant, nonionic surfactant comprising block copolymer (including oligomer) composed of polyethylene oxide chain $(CH_2CH_2O)_m$ and polypropylene oxide chain $[CH_2CH(CH_3)O]_n$ (wherein, m and n is 10-70 and end of said polymer is etherized by H, alcohol or phenol) is desirable.

E. As the organic solvent, alcohols, for example, methanol, butanol, propanol, hexanol or mixture composed of two or more of them are desirable.

EXAMPLE

The present invention is illustrated more specifically according to the Examples, however, not intending to limit the scope of the present invention.

The characteristics of the obtained micro-mesoporous oxide are measured according to the following methods.

1. XRD (product of Rigaku Co., Ltd., RINT 2100, CuKα ray) method: X ray diffraction method: By lower angle (1-6°) peak pattern, periodic structure of fine meso pores can be observed.
2. Nitrogen absorption isothermal curve (product of Coulter Co., Ltd. SA3100): Relative pressure $(P/P_0)$ (X axis) range, where nitrogen absorption (Y axis/volume (mL/g)) steeply increases, corresponds with the length(diameter) of fine pore. The degree of rising relates to fine pore volume.

Example 1

10 wt % of ethanol solution of nonionic surfactant composed of polyethylene oxide chain $(CH_2\ _{CH2}O)_m$ and polypropylene oxide chain $[CH_2CH(CH_3)O]_n$ (wherein, m and n is 10-70 and end of said polymer is etherized by H, alcohol or phenol) was prepared. 0.005-0.01 mole of niobium chloride was added to 10 g of said surfactant and stirred for 20-60 minutes and dissolved. At said process, 0.5-2 mL of water containing 0.05M of alkali or alkali earth ion was added to accelerate hydrolysis of inorganic compound and self-assembling. The $1^{st}$ step aging was carried out on obtained sol solution in air at 35° C. to 60° C. for 2-10 days and A of FIG. 1 was obtained. The $2^{nd}$ step aging was carried out on the obtained gel to stabilize the structure at 60° C. (FIG. 2B), 80° C. (FIG. 2C) and 100° C. (FIG. 2D) for 12-48 hours. Obtained gel after $2^{nd}$ step aging was washed with 0.1-1 L water per 1 g of said gel and filtrated, and said nonionic surfactant, which is the template, was removed. Sediment of removed template was dried and at least a part of the template was reused. The material from which template was removed was dried in air for several hours and the desired micro-mesoporous niobium oxide was obtained.

Characteristics of obtained micro-mesoporous niobium oxide by said producing process are shown as follows.

X-ray diffraction: From the X-ray diffraction peak of FIG. 1, the existence of fine pores structure and periodic structure corresponding to the peak angle in the specimen is confirmed.

By 2 steps aging, peaks are confirmed at nearby 1.3° and 2°, and the existence of highly ordered fine pores structure is confirmed. For the comparison, micro-mesoporous niobium oxide without $2^{nd}$ step aging is indicated by A.

The micro-mesoporous niobium oxide obtained as above is confirmed from X-ray diffraction pattern that the average diameter is 1.7 nm (80% of fine pores are concentrated in the range of 1.7 nm±0.7 nm and reflecting the structure which orderly arrayed by average 6 nm interval. While, the diameter of fine pore of mesoporous niobium oxide obtained by removing the template by calcination is 5 nm.

$N_2$ gas absorption; from ascend feature of $N_2$ gas adsorption isotherm curve uniformity of fine pores can be observed and from the adsorption amount (BET surface area), surface area and pore volume can be observed.

Figure 2:
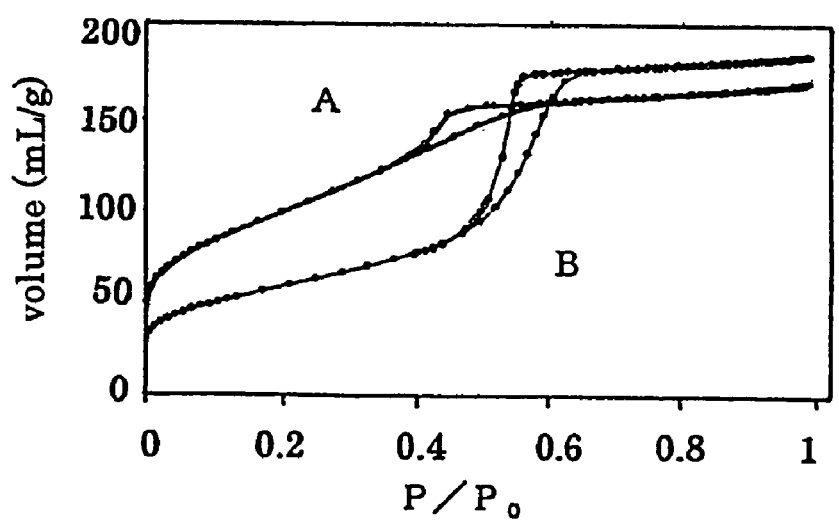
FIG. 2 shows the $N_2$ absorption isotherm curve of micro-mesoporous niobium oxide obtained in Example 1, A shows the case of micro-mesoporous product obtained by removing template by washing with water according to the present invention, while B shows the case of micro-mesoporous product obtained by removing template by baking according to the conventional technique.

From $N_2$ gas adsorption isotherm curve of the product obtained by 2 steps aging shown in FIG. 2 (2 steps aging at 100° C.), it is understood that the radius of fine pore is 1.7 nm and small, and from the ascend feature it is understood that the product has uniform fine pores. Further, it is confirmed that the surface area of the product is 360 m²/g and is the high surface area product.

By the way, the surface area of mesoporous niobium oxide B obtained by removing the template by calcination is 210 m²/g.

Further, although the obtained mesoporous niobium oxide B was not passed the calcinating process, the stability of fine pores is good.

In the case of mesoporous niobium oxide which is obtained using the mesoporous niobium oxide precursor which does not carry out 2 steps aging, since the mesoporous niobium oxide does not have such excellent stability, it is understood that the 2 steps aging of the present invention is essential.

Example 2

Production of micro-mesoporous magnesium-tantalum oxide 0.003 mol of $MgCl_2$ and 0.07 mol of $TaCl_5$ were poured into 10 wt % of P-123 [Trade name, product of BASF: $(HO(CH_2CH_2O)_{20}(CH_2CH(CH_3)O)_{70}(CH_2CH_2O)_{20})$H]/propnol solution. After reacted for 30 minutes, aged at 40° C. for 2-10 days, then $2^{nd}$ step aging was carried out at 100° C. for 24 hours. Template was removed by washing with water, and micro-mesoporous magnesium-tantalum oxide of 2 nm average pore size and 210 m²/g specific surface area was obtained.

Figure 3:
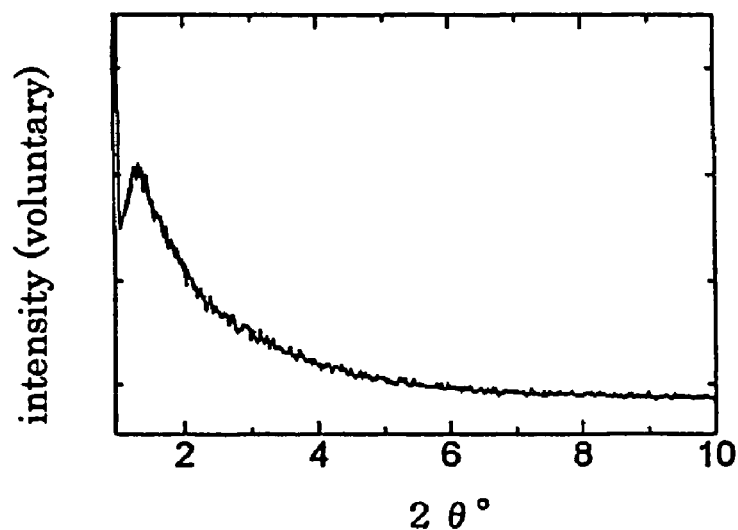
FIG. 3 shows the X-ray diffracting pattern of micro-mesoporous magnesium-tantalum oxide whose average pores size is 2 nm and BET specific surface area is 210 $m^2/g$ obtained by aging of micro-mesoporous magnesium-tantalum oxide of Example 2 at 40° C. for 2-10 days, then further aged secondary at 100° C. for 24 hours.
Figure 4:
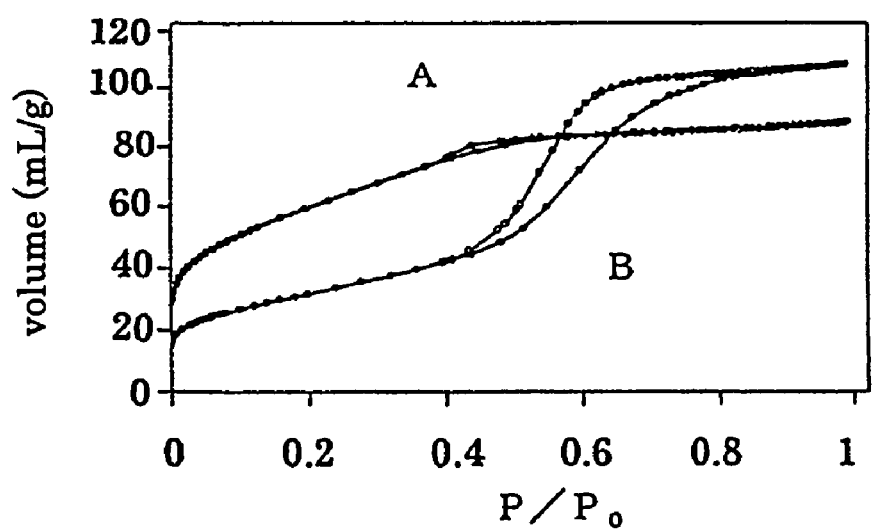
FIG. 4 shows the $N_2$ absorption isotherm curve of micro-mesoporous magnesium-tantalum oxide of Example 2.

X-ray diffraction curve is shown in FIG. 3 and $N_2$ gas adsorption isotherm curve is shown in FIG. 4. In FIG. 4, A is the micro-mesoporous magnesium-tantalum oxide produced by the process for producing of the micro-mesoporous composition of the present invention. While, B is the micro-mesoporous magnesium-tantalum oxide prepared by removing template by calcination, and the average pore size of this micro-mesoporous magnesium-tantalum oxide is 6 nm and BET specific surface area is 114 m²/g.

Example 3

Micro-Mesoporous Tantalum Oxide 0.07 mol of $TaCl_5$ was poured into 10 wt % of P-123 [product name, product of BASF: $(HO(CH_2CH_2O)_{20}(CH_2CH(CH_2)O)_{70}(CH_2CH_2O)_{20})$H]/propanol solution. After reacted for 30 minutes, aged at 40° C. for 1 week, then $2^{nd}$ step aging was carried out at 100° C. for 1 day. Template was removed by washing by 1 L of water, and micro-mesoporous tantalum oxide was obtained.

Average pore size of fine pore of the obtained micro-mesoporous tantalum oxide was 1 nm and surface area (BHT specific surface area) is 120 m²/g. By the way, the average pore size of fine pore of the mesoporous tantalum oxide prepared by removing template by calcination is 3 nm.

Figure 5:
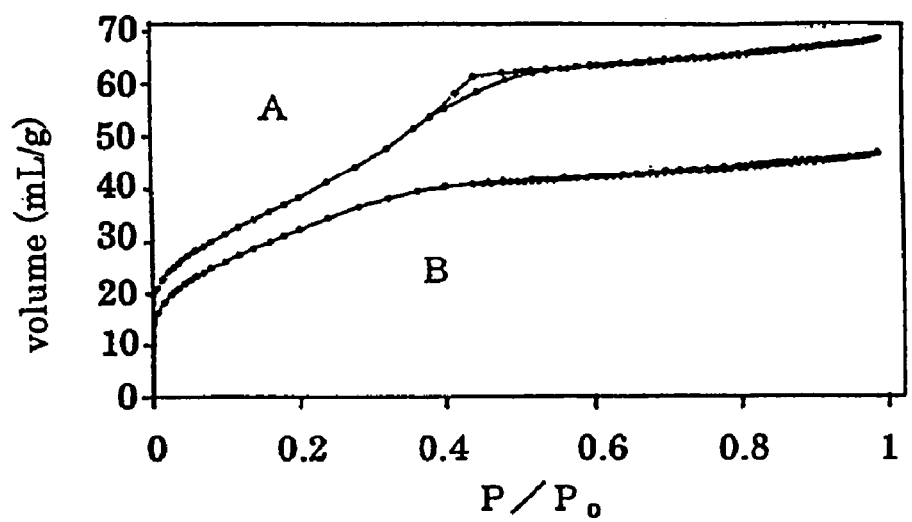
FIG. 5 shows the $N_2$ absorption isotherm curve of micro-mesoporous tantalum oxide whose average fine pores size is 1 nm and surface area (BET specific surface area is 120 $m^2/g$) obtained by aging of micro-mesoporous tantalum oxide of Example 3 at 40° C. for one week, then further aging secondary at 100° C. for one day.

In FIG. 5, $N_2$ gas adsorption isotherm curve of the obtained micro-mesoporous tantalum oxide is shown.

INDUSTRIAL APPLICABILITY

As mentioned above, by the process for producing the transition metal oxide having micro-mesoporous structure of the present invention, the following excellent effect can be provided. That is, the transition metal oxide of micro-mesoporous structure having fine pore of around 1 nm, which can not be obtained by the conventional technique, and the stability-improved fine pore wall can be obtained by using template being able to be removed by washing with water, which is very economical and harmless to the environment can be easily prepared.

What is claim:

1. A method for preparation of a transition metal oxide having a micro-mesoporous structure whose average fine pore size is not less than 1 nm and not more than 2 nm comprising, adding a transition metal salt, which is a precursor of a transition metal oxide and/or a metal alkoxide to a solution prepared by dissolving a polymer surfactant in an organic solvent, dissolving said transition metal salt in said solution, followed by hydrolyzing the transition metal salt and/or metal alkoxide, and preparing a sol solution which is polymerized and self-assembled therefrom, and then obtaining a framework-stabilized gel from the sol solution, and removing the polymer surfactant by using water or water to which an alkali metal or alkaline earth metal ion is added at room temperature wherein the process to obtain the stabilized gel contains 2nd step aging process which is carried out under the presence of oxygen gas at 60° C. to 140° C. for 12-48 hours on the gel obtained by gelating the sol solution to gel by aging under the presence of oxygen gas at 35° C. to 60° C.

2. The method for preparation of transition metal oxide having micro-mesoporous structure of claim 1, wherein surface area of transition metal oxide having micro-mesoporous structure is from 100 $m^2/g$ to 500 $m^2/g$.

3. A method for preparation of a transition metal oxide having a micro-mesoporous structure whose average fine pore size is not less than 1 mm and not more than 2 nm comprising, adding a transition metal salt, which is a precursor of a transition metal oxide and/or a metal alkoxide to a solution prepared by dissolving a polymer surfactant in an organic solvent, dissolving said transition metal salt in said solution, followed by hydrolyzing the transition metal salt and/or metal alkoxide, and preparing a sol solution which is polymenzed and self-assembled therefrom, and then obtaining a framework-stabilized gel from the sol solution, and removing the polymer surfactant by using water or water to which an alkali metal or alkaline earth metal ion is added at room temperature wherein polymer surfactant is a nonionic surfactant having polyalkyleneoxide block copolymer frame wherein the process to obtain the stabilized gel contains 2nd step aging process which is carried out under the presence of oxygen gas at 60° C. to 140° C. for 12-48 hours on the gel obtained by gelating the sol solution to gel by aging under the presence of oxygen gas at 35° C. to 60° C.

4. The method for preparation of transition metal oxide having mesoporous structure of claim 3, wherein surface area of transition metal oxide having micro-mesoporous structure is from 100 $m^2/g$ to 500 $m^2/g$.

* * * * *

UNITED STATES PATENT AND TRADEMARK OFFICE
CERTIFICATE OF CORRECTION

PATENT NO.        : 7,223,377 B2
APPLICATION NO.   : 10/507478
DATED             : May 29, 2007
INVENTOR(S)       : Domen, Nomura and Ri It is certified that error appears in the above-identified patent and that said Letters Patent is hereby corrected as shown below:

In the claims, col. 8, line 8, replace "polymenzed" with --polymerized--.

Signed and Sealed this

Third Day of July, 2007

JON W. DUDAS
*Director of the United States Patent and Trademark Office*